(12) United States Patent  (10) Patent No.: US 6,662,098 B2
Hellmann et al.  (45) Date of Patent: Dec. 9, 2003

(54) METHOD AND DEVICE FOR SETTING A GEAR RATIO IN A MOTOR VEHICLE HAVING A DISTANCE AND/OR VEHICLE-SPEED CONTROLLER

(75) Inventors: Manfred Hellmann, Hardthof (DE); Hermann Winner, Karlsruhe (DE); Albrecht Irion, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/836,799

(22) Filed: Apr. 17, 2001

(65) Prior Publication Data
US 2002/0069009 A1 Jun. 6, 2002

(30) Foreign Application Priority Data

Apr. 17, 2000 (DE) .......................................... 100 18 911

(51) Int. Cl.$^7$ .............................................. B60K 17/00
(52) U.S. Cl. ........................................................ 701/95
(58) Field of Search .......................... 701/51–56, 61–63, 701/87, 123, 93–97, 101–104, 110–111; 477/17–18, 34, 54, 41–43, 77, 79, 80–81, 107, 110, 111, 113; 192/215, 219, 220; 180/337, 364, 370, 336

(56) References Cited

U.S. PATENT DOCUMENTS 6,066,070 A * 5/2000 Ito et al. ........................ 477/43
6,076,622 A * 6/2000 Chakraborty et al. ........ 180/169
RE37,703 E * 5/2002 Bellinger ..................... 477/111

OTHER PUBLICATIONS

SAE Technical Paper Series 961010, International Congress and Exposition, Detroit, Feb. 26–29, 1996, "Adaptive Cruise Control System—Aspects and Development Trends", Winner, Witte, Uhler, Lichtenberg, Robert Bosch GmbH.

* cited by examiner

Primary Examiner—Thu Nguyen
(74) Attorney, Agent, or Firm—Kenyon & Kenyon

(57) ABSTRACT

A method and a device for setting a gear ratio of the transmission while a distance and/or vehicle-speed control system (ACC system) is activated. A setpoint variable, as a function of which at least the driving motor of the vehicle is controlled, is input. The setpoint variable or a value derived from this setpoint variable is limited in response to the existence of a first operating state, and the gear ratio is then set as a function of the limited variable, or as a function of the limited value. The gear ratio is set as a function of the setpoint variable, or as a function of the value, in response to the existence of a second operating state. The method and device prevent unnecessary and uncomfortable occurrences of downshifting during ACC operation, without losing the option of accelerating sharply.

8 Claims, 2 Drawing Sheets

METHOD AND DEVICE FOR SETTING A GEAR RATIO IN A MOTOR VEHICLE HAVING A DISTANCE AND/OR VEHICLE-SPEED CONTROLLER

FIELD OF THE INVENTION

The present invention relates to a method and a device for setting a gear ratio in a motor vehicle having distance and/or vehicle-speed adjustment.

BACKGROUND INFORMATION

Distance and/or vehicle-speed controllers can be, for example, also designated as adaptive cruise control systems (ACC).

An ACC system based on radar is discussed in SAE paper 961010 (SAE Technical Paper Series 961010, International Congress and Exposition, Detroit, Feb. 26–29, 1996, "Adaptive Cruise Control System—Aspects and Development Trends", Winner, Witte, Uhler, Lichtenberg, Robert Bosch GmbH). In this case, the radar sensor having multiple target capability is mounted at the front end of a motor vehicle, in order to determine distances from, and speeds relative to vehicles driving ahead. The data ascertained by the radar system are supplied to a control unit via a bus system. Using the transmitted radar data and the wishes of the driver, this control unit determines an appropriate acceleration request which, in turn, is transmitted to a longitudinal control unit. The longitudinal control unit controls actuators in accordance with the acceleration request of the control unit. These actuators can be the engine of the motor vehicle, the clutch, or the brakes of the motor vehicle. The corresponding control of the actuators produces a certain behavior of the motor vehicle, which, in turn, is fed back to the control unit, thus forming a control loop. Either the drive train or the brakes are activated as a function of the corresponding acceleration request. The estimated incline of the road is considered in this selection. In addition, the limitations, i.e., physical limitations of the drive train and the braking system must be known or appropriately calculated.

In combining an ACC system with an automatic transmission, it is believed that unnecessary occurrences of transmission downshifting that reduce the driving comfort should be prevented during ACC closed-loop control.

For example, in a motor vehicle having an Otto engine, the driver of the motor vehicle may operate the throttle valve of the engine directly. This results in a nonlinear accelerator-pedal engine-torque characteristic to which the driver may be accustomed. In the case of newer vehicles, the driver no longer selects the throttle-valve setting or the engine load directly, but rather, just his or her propulsion wish or the output torque of the engine or the power output of the engine. To this end, the accelerator-pedal positions are assigned different output engine torques, or assigned the engine power outputs, using an engine characteristics map. The gear ratio in automatic transmissions may be selected mainly as a function of the engine load (throttle-valve position) and the driving speed.

In order to maintain the nonlinear accelerator-pedal engine-torque characteristic when combining an engine control system, in which the throttle-valve position is no longer input by the accelerator, with a conventional transmission control system, the gears are shifted on the basis of a so-called "virtual" accelerator-pedal value, instead of using the torque or power output desired by the driver. The "virtual" accelerator-pedal value corresponds to the real accelerator-pedal value, at which the requested vehicle propulsion would be set. This may create a problem when the setpoint variable, e.g., a setpoint torque, input by the ACC system, is close to the maximum engine torque. In this range, a small change in the setpoint torque already leads to a large jump in the virtual accelerator-pedal value, whereupon the transmission control system changes gears spontaneously. This shifting of gears can be especially disturbing and uncomfortable when there is only a small difference in torque between the setpoint torque and the maximum engine torque. This phenomenon can be counteracted by limiting the inverse accelerator-pedal value, e.g., to 80%. Such a limitation can also help in the ACC case, but it may prevent rapid downshifting when this is really needed.

SUMMARY OF THE INVENTION

The present invention relates to a method and a device for setting a gear ratio of the transmission installed in the drive train of a motor vehicle, while a distance and/or vehicle-speed control system (ACC system) is activated. A setpoint variable, as a function of which at least the driving motor of the vehicle is controlled, is input while the distance and/or vehicle-speed control system is activated.

An exemplary embodiment of the present invention provides for limiting this setpoint variable or a value derived from this setpoint variable, in response to the existence of a first operating state (normal ACC operation). The gear ratio can then set as a function of the limited variable, or as a function of the limited value. The gear ratio can be set as a function of the setpoint variable, or as a function of the value, in response to the existence of a second operating state.

An exemplary embodiment of the present invention can prevent uncomfortable gear changes of the transmission during ACC operation, without hindering or delaying downshifting when sharp acceleration is desired.

In an exemplary embodiment of the present invention, the setpoint variable representing a setpoint value for the output torque or the power output of the vehicle engine can be provided. An actual quantity representing the instantaneous output torque or the instantaneous power output of the vehicle engine can then be ascertained. Then, the second operating state can exists when the actual quantity deviates from the setpoint variable in a specifiable manner. The second operating state can exist even when the setpoint variable exceeds the actual quantity by a specifiable, first threshold value.

In another exemplary embodiment of the present invention, for the existence of the second operating state, the absolute value of the actual quantity can be provided to exceed a specifiable, second threshold value. It is believed that this can effectively prevent instances of false activation.

In another exemplary embodiment of the present invention, the driver of the vehicle can input an accelerator-pedal value representing the position of the accelerator using an accelerator pedal that can be operated by him or her. An additional setpoint variable can be ascertained from the accelerator-pedal variable using a nonlinear, first engine characteristics map. This additional variable may represent the propulsion wish that can be specified by the driver.

During activation of the ACC system, a virtual accelerator-pedal value is ascertained, using a second engine characteristics map, from the setpoint variable originating at the ACC system. When the ACC system is not activated, a virtual accelerator-pedal value is ascertained from the additional setpoint variable (propulsion wish of the driver), using the second engine characteristics map. The second engine characteristics map can be laid out inversely to the first engine characteristics map. However, it can also be provided that the actual accelerator-pedal angle be taken directly.

Another exemplary embodiment of the present invention may also provide for the gear ratio being set as a function of the inverse accelerator-pedal value and for limiting the inverse accelerator-pedal.

DETAILED DESCRIPTION

Figure 1:
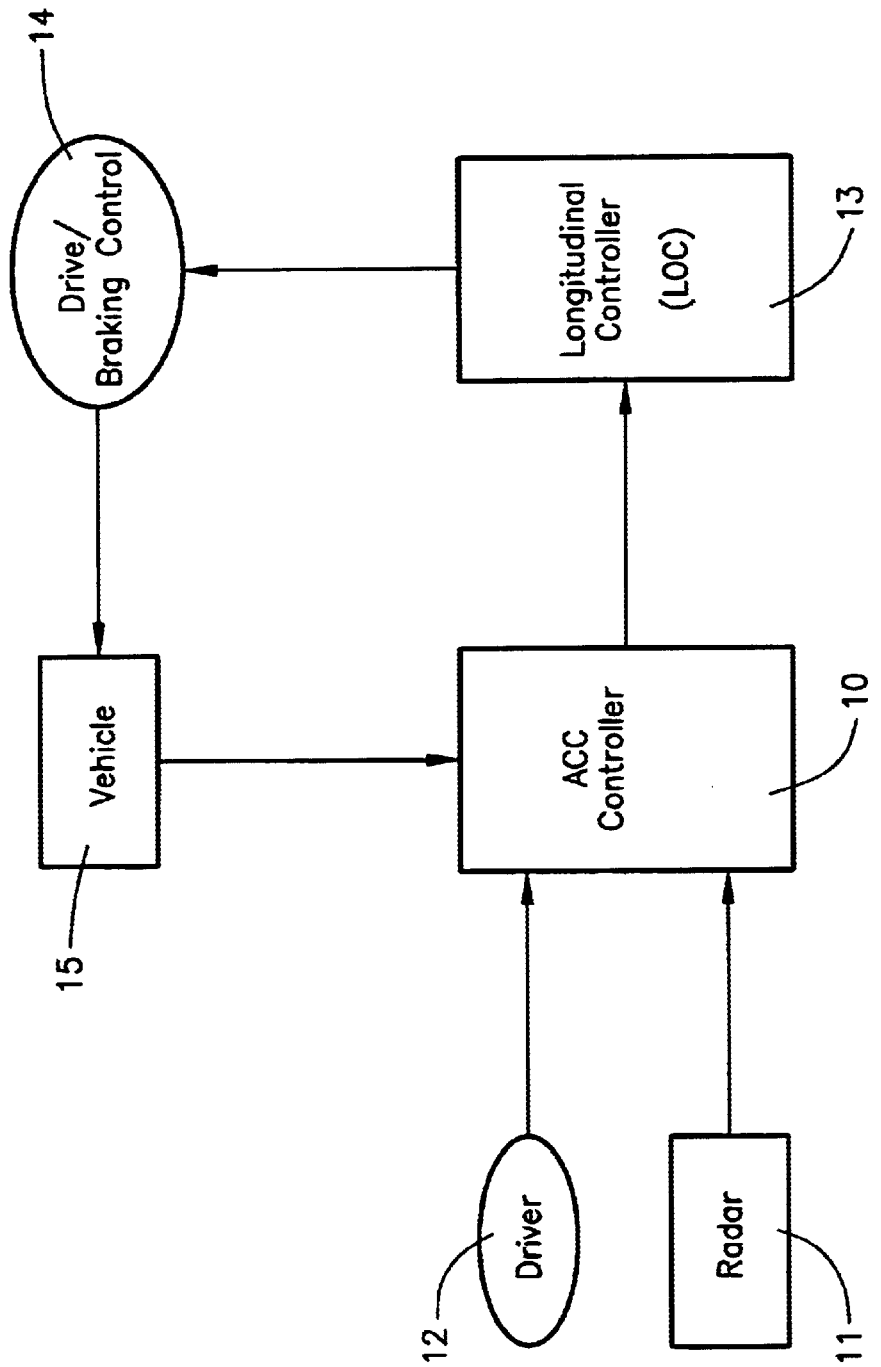
FIG. 1 shows a closed loop of a system for adaptively controlling distance and/or vehicle speed.

FIG. 1 shows a "conventional" adaptive distance and/or vehicle-speed control system for a motor vehicle. A central control unit 10 (ACC controller, ACC control device) represents the central point of the control system. Speed and distance data for vehicles driving ahead are transmitted by a radar sensor 11 to control unit 10. The radar system 11 may be based on high-frequency microwave radiation, a LIDAR (light detection and ranging system), or an infrared sensor.

The exemplary method according to the present invention is not limited to an FMCW (Frequency Modulated Continuous Wave) radar (as in the SAE paper 961010) but can also be used, for instance, in connection with a system working in accordance with the impulse radar principle.

The speed data of vehicles driving ahead (and also of other detected objects, e.g., stationary objects at the side of the road), which are transmitted by radar unit 111 to control unit 10, are relative speed values based on the speed of the individual (or reference) vehicle. In addition, signals are transmitted to control unit 10 by driver 12 of the motor vehicle. For example, these signals can be accelerator-pedal positions, braking interventions (or instances of braking applications), steering movements, but also operating functions for the ACC system. From the data supplied by driver 12 and radar unit 11, control unit 10 determines an acceleration request which is transmitted to a longitudinal control unit 13 (LOC). Longitudinal control unit 13 converts the acceleration request transmitted by control unit 10, into corresponding control signals for drive-train/brake control 14 having the corresponding actuators. Actuators 14 may includes arrangements, apparatuses or structures for accelerating or decelerating. A throttle valve control may be the arrangement, apparatus or structure for accelerating, while an intervention in the (active) brake system may be the arrangement, apparatus or structure for decelerating. The handling of vehicle 15 is a function of how actuators 14 are controlled. An output engine torque or a braking torque can be provided as an output signal of the longitudinal controller. In this case, the acceleration or deceleration requests can be converted into corresponding setpoint torques in controller 13.

The instantaneous vehicle condition data are transmitted from vehicle 15 to control unit 10. This feedback of the present vehicle data completes the loop that includes control unit 10, longitudinal control unit 13, drive-train/braking control 14, and vehicle 15.

Figure 2:
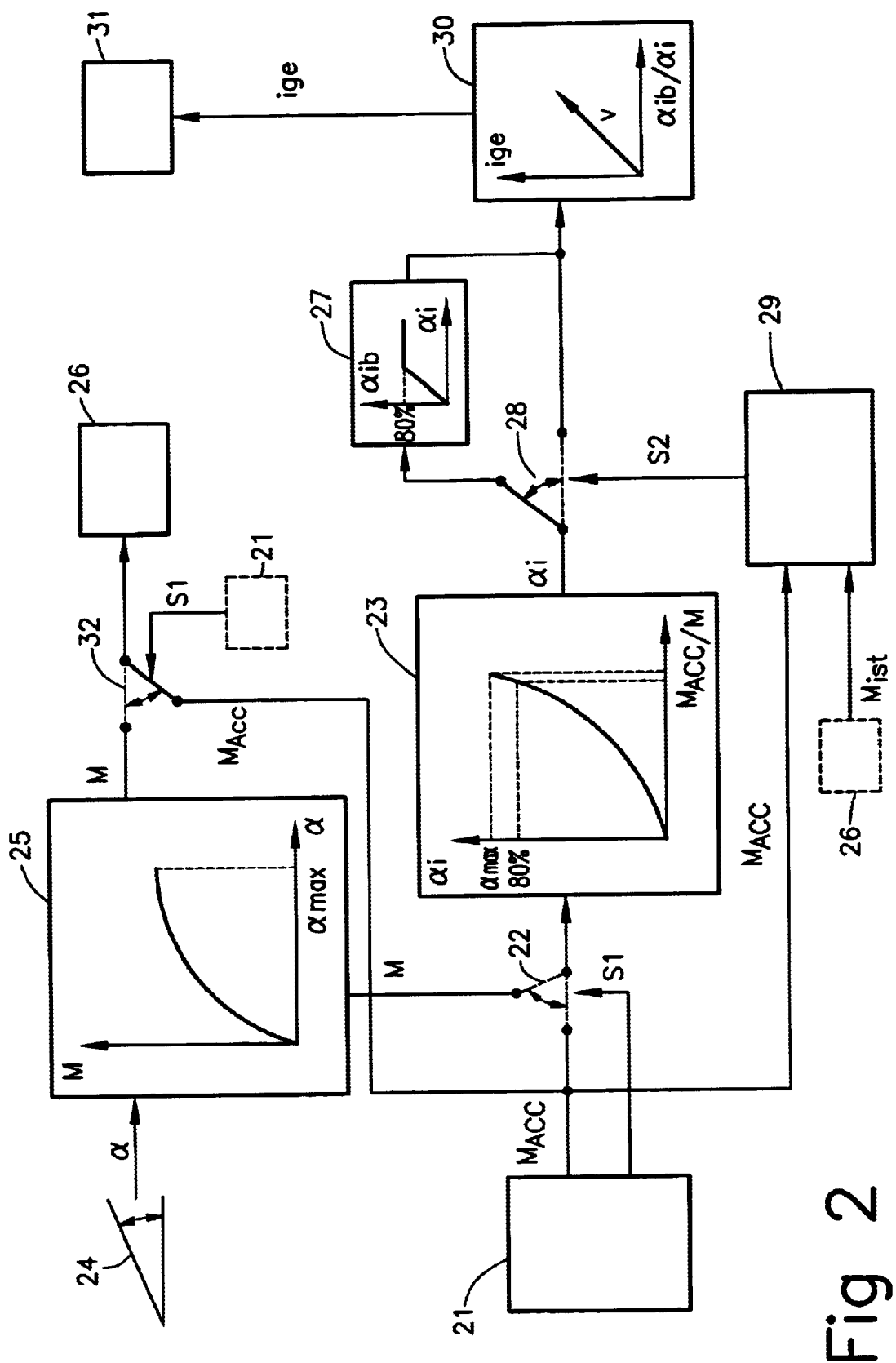
FIG. 2 shows a block diagram of an exemplary embodiment according to the present invention.

FIG. 2 shows a block diagram of an exemplary embodiment of the present invention. The driver of the vehicle can specify a propulsion wish using the position alpha of accelerator pedal 24. Starting from accelerator-pedal angle alpha, a setpoint variable M for the output engine torque can ascertained in block 25, using a nonlinear engine characteristics map. To this end, each value alpha can be assigned a torque value M, up to maximum setting alphamax, using the engine characteristics map exemplarily represented in block 25.

In addition, an instantaneous setpoint value MACC can be formed by longitudinal control unit 21, described in FIG. 1, in order to control the vehicle speed and/or distance.

Depending on the position of switch 22 (switching signal S1), the engine or engine control unit 26 either receives setpoint variable MACC when the ACC system is activated, or receives setpoint variable M when the ACC is not being operated. The actuators of the engine can be controlled as a function of operation, in such a manner, that the respective, desired torque is produced. In this exemplary embodiment, switching signal S1 is formed in ACC system 21. The driver may determine if the ACC system is activated by an operating switching arrangement, apparatus or structure provided for this purpose or by operating accelerator 24 in a certain manner.

The adjustment of gear ratio ige of transmission 31 is as follows. Depending on the activation of the ACC system (switching signal S1), either setpoint torque M input via the accelerator pedal or setpoint torque MACC input by the ACC system can be transmitted to block 23, via switch 22.

An engine characteristics map, which is the inverse of the engine characteristics map shown in block 25, can be stored in block 23. Therefore, depending on the position of switch 22, each torque value M or MACC can be assigned an inverse accelerator-pedal angle alphai.

In block 30, the gear ratio ige can be determined by an engine characteristics map as a function of inverse accelerator-pedal angle alphai or limited, inverse accelerator-pedal angle alphaib (formed in block 27 still to be described). Vehicle longitudinal velocity V can be used for determining gear ratio ige. In transmission 31, the appropriate gear ratio can be set as a function of value ige.

Maximum value alphamax of the accelerator-pedal deflection, as well as the 80% value of the maximum deflection, are drawn into the engine characteristics map schematically represented in block 23. At the corresponding torque values in the maximum range, one recognizes the effect mentioned at the outset, of a small change in setpoint torque (M or MACC) already causing a large jump in inverse accelerator-pedal value alphai. If gear ratio ige would now be determined in block 30, as a function of the inverse accelerator-pedal value alphai, then just small torque changes in the range of the maximum torque or maximum deflection alphamax would lead to unnecessary occurrences of downshifting in the transmission.

For this reason, inverse accelerator-pedal values alphai are limited in block 27, e.g., to values up to 80% of full deflection alphamax, in normal ACC operation.

The position of switch 28, which is determined by switching signal S2, now specifies whether limited, inverse accelerator-pedal value alphaib (normal ACC operation) or unlimited, inverse accelerator-pedal value alphai is supplied to block 30.

To determine or evaluate switching signal S2, instantaneous, actual torque Mist of the vehicle engine is supplied to block 29. This may be in engine control unit 26. In addition, setpoint torque MACC from ACC system 21 is fed to block 29.

In "normal" ACC operation, switch 28 is in the position denoted by a solid line in FIG. 2. In this way, the inverse accelerator-pedal value is limited.

Using switching signal S2, switch 28 can be brought into the position represented by a dashed line in FIG. 2, when the torque difference $$\Delta M = M_{ACC} - M_{ist}$$

exceeds a specifiable threshold value SW1. In this case, torque MACC requested by the ACC system deviates "considerably" from the currently produced torque Mist, since the maximum moment can be reached in this operating point of the engine.

A further criterion for the switching position of switch 28 represented by a dashed line is value Mist of currently produced engine torque Mist. If Mist exceeds a specifiable threshold value SW2 that is close to the maximum moment, then the system is exactly in the range, in which small changes of the setpoint moment MACC lead to a large jump in inverse accelerator-pedal value alphai, and therefore, lead to possible downshifting.

The limitation of the inverse accelerator-pedal angle alphai in block 27 is avoided when the following conditions exist:

$$\Delta M > SW1;$$

and $$M_{ist} > SW2,$$

the second condition only being optional. Otherwise, the inverse accelerator-pedal value can be limited.

This can prevent unnecessary and uncomfortable occurrences of downshifting during ACC operation, without losing the option of sharply accelerating.

The exemplary embodiments of the present invention may not require changes in the switching strategy (switching according to accelerator-pedal angle), or changes or adjustments to the engine control software.

What is claimed is:

1. A method for setting a gear ratio of a transmission in a drive train of a motor vehicle while at least one of a distance control system and a vehicle-speed control system is activated, the method comprising the steps of:

inputting a first setpoint variable during an activation of the at least one of the distance control system and the vehicle-speed control system, an engine of the motor vehicle being controllable as a function of the set point variable;

limiting at least one of the first setpoint variable and a derived value of the first setpoint variable to provide at least one of a limited setpoint variable and a limited derived value;

setting a gear ratio as a function of the at least one of the limited setpoint variable and the limited derived value in response to a first operating state and setting the gear ratio as a function of the at least one of the first setpoint variable and the derived value in response to a second operating state;

inputting an accelerator-pedal value representing a position of an accelerator pedal of the motor vehicle, wherein the step of inputting is performed by a driver operating the accelerator pedal;

ascertaining another setpoint variable from the accelerator-pedal value using a nonlinear first engine characteristics map; and ascertaining a virtual accelerator-pedal value using a second engine characteristics map by using the first setpoint variable when the at least one of the distance control system and the vehicle-speed control system is activated, and by using the another setpoint variable when the at least one of the distance control system and the vehicle-speed control system is not activated, wherein:

the step of setting the gear ratio is performable as a function of the virtual accelerator-pedal value; and the step of limiting is performable by limiting an inverse accelerator-pedal value.

2. The method of claim 1, further comprising the steps of:

at least one of ascertaining, selecting and activating an actual quantity representing at least one of an instantaneous output torque and an instantaneous power output of the engine;

wherein:

the first setpoint variable represents a setpoint value for at least one of an output torque and a power output of the engine; and the second operating state exists when one of (i) the actual quantity deviates from the at least one of the first setpoint variable and the derived value, and (ii) the at least one of the first setpoint variable and the derived value exceeds the actual quantity by a first threshold value.

3. The method of claim 2, wherein the second operating state exists when an absolute value of the actual quantity exceeds a second threshold value.

4. The method of claim 1, wherein:

the second engine characteristics map is laid out inversely to the nonlinear first engine characteristics map.

5. A device for setting a gear ratio of a transmission in a drive train of a motor vehicle while at least one of a distance control system and a vehicle-speed control system is activated, a first setpoint variable being input during an activation of the at least one of the distance control system and the vehicle-speed control system, an engine of the motor vehicle being controllable as a function of the first setpoint variable, the device comprising:

an arrangement for limiting at least one of the first setpoint variable and a derived value of the first setpoint variable to provide at least one of a limited setpoint variable and a limited derived value;

an arrangement for setting a gear ratio as a function of the at least one of the limited setpoint variable and the limited derived value, in response to a first operating state and for setting the gear ratio as a function of the at least one of the first setpoint variable and the derived value in response to a second operating state;

an arrangement for ascertaining another setpoint variable from an accelerator-pedal value using a nonlinear first engine characteristics map;

an arrangement for ascertaining a virtual accelerator-pedal value from a second engine characteristics map by using the first setpoint variable when the at least one of the distance control system and the vehicle-speed control system is activated, and by using the another setpoint variable when the at least one of the distance control system and the vehicle-speed control system is not activated, an arrangement for setting the gear ratio as a function of the virtual accelerator-pedal value;

wherein:

a driver of the motor vehicle inputs an accelerator-pedal value representing the position of an accelerator pedal of the motor vehicle by operating the accelerator pedal; and the arrangement for limiting is operable for limiting an inverse accelerator-pedal value.

6. The device of claim 5, further comprising:

an arrangement for ascertaining an actual quantity representing at least one of an instantaneous output torque and an instantaneous power output of an engine of the motor vehicle; and an arrangement for detecting the second operating state when the actual quantity deviates from the at least one of the first setpoint variable and the derived value, the second operating state existing when the at least one of the first setpoint variable and the derived value exceeds the actual quantity by a first threshold value; and wherein the first setpoint variable represents a setpoint value for at least one of an output torque and a power output of an engine.

7. The device of claim 6, wherein the second operating state exists when an absolute value of the actual quantity exceeds a second threshold value.

8. The device of claim 5, wherein:

the second engine characteristics map is laid out inversely to the nonlinear first engine characteristics map.

* * * * *